(12) United States Patent
Nadal Aloy

(10) Patent No.: US 9,151,350 B2
(45) Date of Patent: Oct. 6, 2015

(54) SELF-VENTILATED BRAKE DISC

(76) Inventor: Jordi Nadal Aloy, Barcelona (ES)

( * ) Notice: Subject to any disclaimer, the term of this patent is extended or adjusted under 35 U.S.C. 154(b) by 236 days.

(21) Appl. No.: 13/124,738

(22) PCT Filed: Nov. 24, 2009

(86) PCT No.: PCT/ES2009/070527
§ 371 (c)(1),
(2), (4) Date: Feb. 20, 2012

(87) PCT Pub. No.: WO2010/061028
PCT Pub. Date: Jun. 3, 2010

(65) Prior Publication Data
US 2012/0138398 A1    Jun. 7, 2012

(30) Foreign Application Priority Data
Nov. 27, 2008 (ES) .................... 200802448 U

(51) Int. Cl.
*F16D 65/12* (2006.01)
*F16D 65/02* (2006.01)
*F16D 69/00* (2006.01)

(52) U.S. Cl.
CPC .............. *F16D 65/12* (2013.01); *F16D 65/128* (2013.01); *F16D 2065/1328* (2013.01); *F16D 2069/004* (2013.01)

(58) Field of Classification Search
CPC ................ F16D 2065/1328; F16D 2065/1332; F16D 2069/004; F16D 65/12; F16D 65/123; F16D 65/127; F16D 65/128
USPC .................... 188/18 A, 26, 218 XL, 264 A
See application file for complete search history.

(56) References Cited

U.S. PATENT DOCUMENTS

| | | | | |
|---|---|---|---|---|
| 3,371,749 A | * | 3/1968 | Lucien et al. | 188/73.1 |
| 3,623,577 A | | 11/1971 | Scharlack | |
| 5,005,676 A | * | 4/1991 | Gassiat | 188/218 XL |
| 2006/0113008 A1 | * | 6/2006 | Hirasawa et al. | 148/325 |

FOREIGN PATENT DOCUMENTS

| | | | |
|---|---|---|---|
| DE | 2620261 | 11/1977 | |
| EP | 521754 | 1/1993 | |
| ES | 2260979 | 11/2006 | |
| JP | 57203154 | * 12/1982 | |
| JP | 3255233 | 11/1991 | |
| WO | 2005/075847 | 8/2005 | |
| WO | WO 2005075847 A1 | * 8/2005 | F16D 65/12 |

* cited by examiner

*Primary Examiner* — Robert A Siconolfi
*Assistant Examiner* — Charles Poon
(74) *Attorney, Agent, or Firm* — Sturm & Fix LLP

(57) ABSTRACT

Self-ventilated brake disk, particularly for vehicles, comprising a unique body formed by a frictional circular crown and a hub transmitting the couple to the whole disk, wherein the circular crown includes multiple grooves arranged radially in respect to the center of the disk, including at least a portion with a predetermined width arranged between each of the grooves, said portions been arranged on the same plane that the rest of the circular crown. In this way, the wear of the brake pad is reduced, having a simple construction and providing good heat dissipation during the contact of the brake pad and the friction surface of the disk.

3 Claims, 3 Drawing Sheets

PRIOR ART

SELF-VENTILATED BRAKE DISC

SUBJECT OF THE INVENTION

This invention refers to a brake disk incorporating substantial innovations and advantageous characteristics.

More specifically the invention refers to a self-ventilated brake disk especially aimed for vehicles, comprising a body with a unique part formed by a frictional circular crown and a hub to transmit the couple to a whole of the disk. The circular crown includes a series of grooves arranged in radial direction in respect to the centre of the disk.

BACKGROUND OF THE INVENTION

At present, there is a variety of brake disk for vehicles, in particular motorcars. Among them, we may take into account the self-ventilated brake disks, used in most of the present road vehicles, such as motorcars and trucks.

One of the presently know brake disks, with the aim to reduce the amount of material needed for its manufacture and to have good properties as to the dissipation of heat, has in the circular crown multiple grooves (see FIG. 1), which substantially follow a zig-zag pattern.

However, in practice it has been observed that said zig-zag pattern enhances the wear of the brake pads when contacting the friction surface of the disk due to the fact that during the time in which the brake pad establishes contact on the disk, said pad exerts a vertical pressure, so that the grooves act as a shear for the brake pad, given the fact that said pad has a tendency to introduce itself within the grooves.

The applicant is not aware of any invention showing all the characteristics which are explained in this description.

DESCRIPTION OF THE INVENTION

The invention has been made with the aim to provide a brake disk to solve all the problems which have been previously mentioned, providing other additional advantages which will be obvious from the reading of the following description.

Therefore, it is an object of this invention to provide a self-ventilated brake disk, particularly for vehicles, of the type comprising a body with a unique part forming a frictional circular crown and a hub which transmits the couple to the whole disk, in which the circular crown includes multiple grooves arranged radially in respect of the centre of the disk, which is characterized by the fact that it includes at least a bridge-like portion arranged in each of the grooves, said portions being in the same plane that the rest of the circular crown.

Preferably, each of the portions arranged between each of the grooves defines at least a continuous circular path.

In one alternative embodiment of the invention, each of the portions arranged between each of the grooves defines two circular paths which are concentric to each other.

Given these characteristics, an improved brake disk is obtained which permits to reduce the wear of the brake pads, does not require a difficult construction of the mould for its manufacture and therefore permits to obtain a low cost of manufacture. Besides, another not less important aspect consists in the fact that it provides a good heat dissipation during the contact of the brake pad on the friction surface of the disk.

In a particularly preferred embodiment of the invention, both surfaces of the circular crown are provided with grooves, including each groove at least a portion with a predetermined width arranged between each of the grooves, said portions being on the same plane that the rest of the circular crown, ensuring a low wear of both opposed brake pads, engaging each of them by friction a corresponding surface of the brake disk.

Other characteristics and advantages of the brake disk which is the subject matter of this invention will be obvious from the description of a preferred embodiment, which is not exclusive, which is shown as a not limitative example in the following drawings in which:

DESCRIPTION OF A PREFERRED EMBODIMENT

Figure 1:
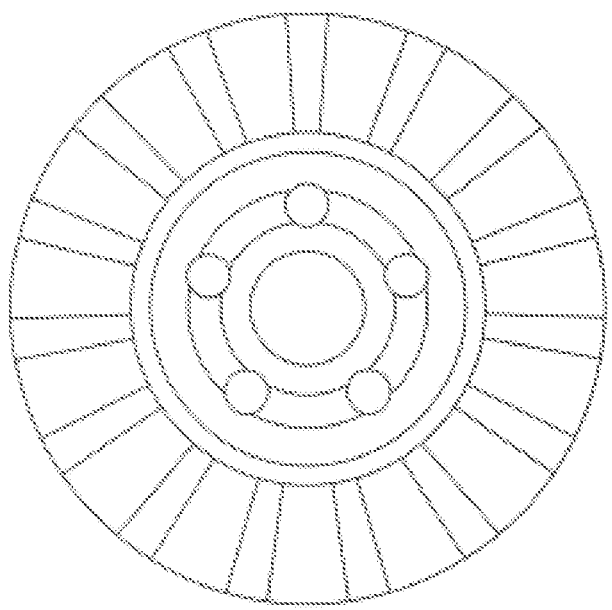
FIG. 1. Shows a top view of a brake disk according to the state of the art.
Figure 2:
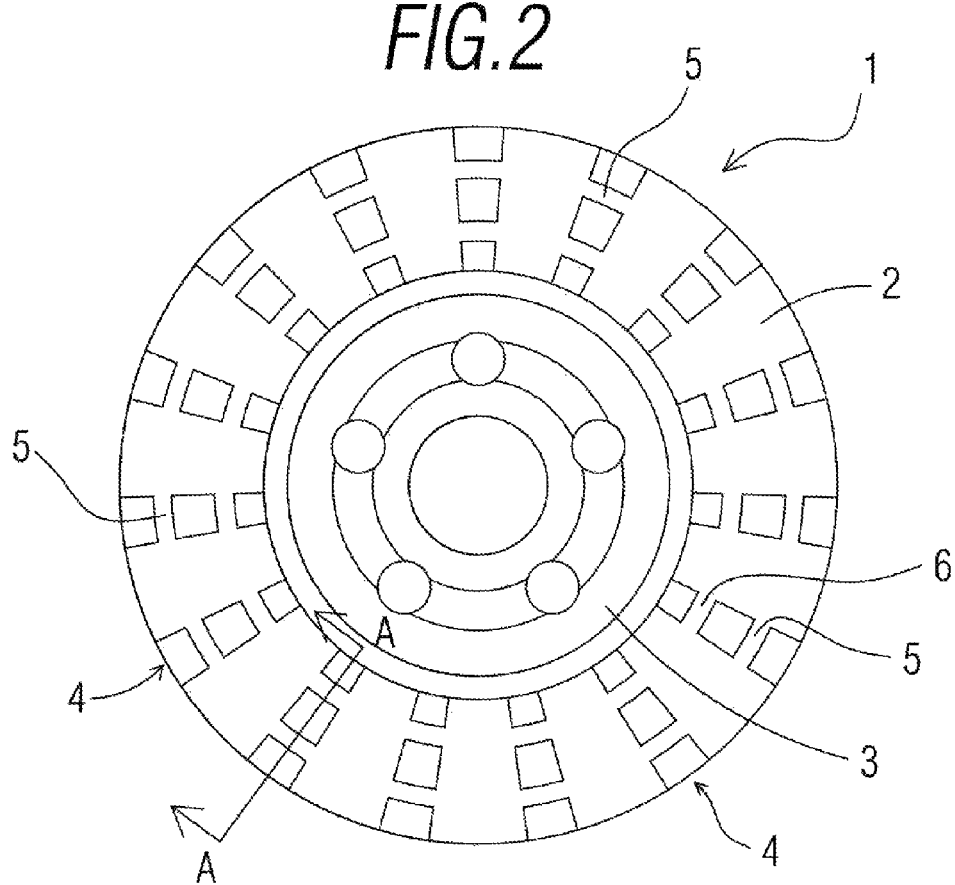
FIG. 2. Shows a top view of a brake disk according to the present invention.
Figure 3:
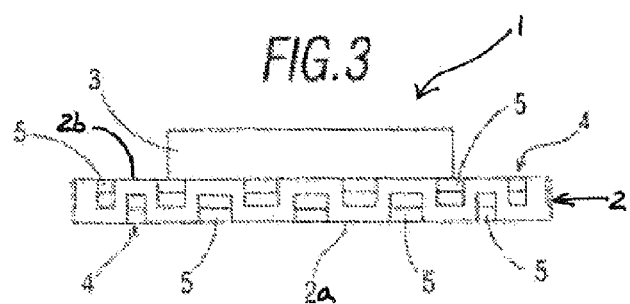
FIG. 3. Shows a elevation view of the brake disk of FIG. 2.

As shown in the enclosed set of drawings, a self-ventilated brake disk, according to the present invention, which bears the general numeral 1, comprises a unique body obtained by means of casting, which essentially has a frictional circular crown 2 as well as a hub 3 transmitting the couple to the whole disk 1 which is aimed at being secured on the shaft of the wheel of the vehicle, wherein the circular crown 2 includes multiple grooves 4 arranged radially in respect to the centre of said disk.

Figure 4:
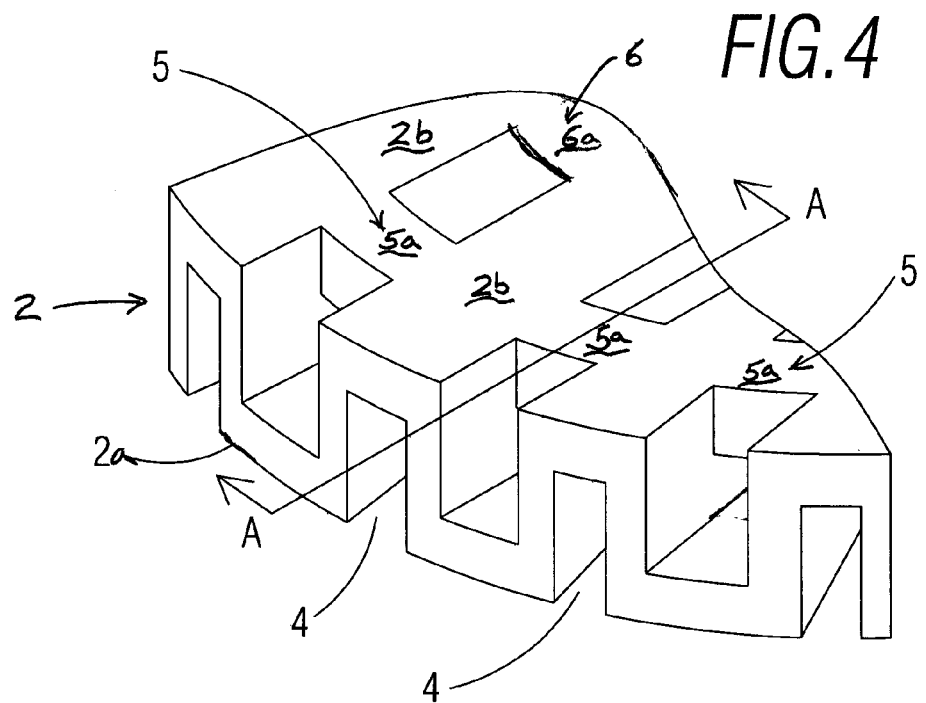
FIG. 4. Shows a perspective view of a detail of a portion of the brake disk according to the invention.
Figure 5:
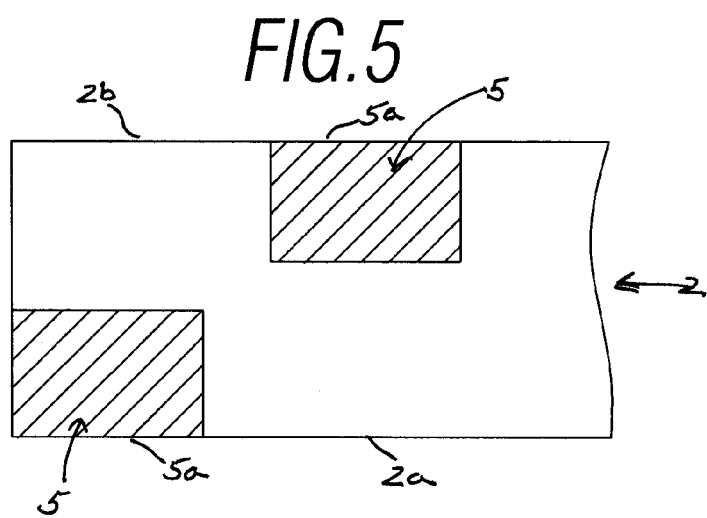
FIG. 5. Shows a cross section along line A-A.

As will be more clearly appreciated in FIG. 1, each of the grooves 4 has two portions 5, 6 having a predetermined width and outer surfaces 5*a*, 6*a*, by way of a "bridge" (see FIG. 4), which are separated by a predetermined distance defining two circular paths, so that the wear of the brake pads (not shown) is reduced. Said portions 5, 6 are arranged at both opposite faces 2*a*, 2*b* of the brake disk 1.

To carry out the manufacture of the brake disk according to the invention, only one mould in needed, made out of two halves which may be engaged one onto the other, obtaining it this way the internal voids which define the "bridges".

It is obvious that the grooves 4 may be linear o substantially curved, as disclosed for example in the patent of invention ES 2 260 979 of the present applicant.

The details, forms, dimensions and other accessory elements, as well as the materials used in the manufacture of a brake disk according to the invention may be conveniently substituted by other technically equivalent which do not depart from the essential features of the invention or from the scope of the same as defined in the following claims.

The invention claimed is:

1. Self-ventilated brake disk, particularly for vehicles, comprising a body including a frictional circular crown and a hub, wherein the circular crown includes multiple grooves having a depth arranged radially in respect to the centre of the disk, the crown having a thickness greater than the depth of the grooves, and two opposed faces, the brake disk comprising a bridge portion having a thickness smaller than the groove depth and a predetermined width, said bridge portion being arranged in each of the grooves and having a outer surface in the same plane as one of the two opposed faces of the rest of the circular crown, wherein each bridge portion on one of the two opposed faces is disposed to be aligned with an empty space on the other of the two opposed faces; and wherein each of the bridge portions arranged in each of the grooves defines at least one continuous circular path.

2. Self-ventilated brake disk, according to claim 1, wherein each of the bridge portions arranged in each of the grooves define multiple circular paths arranged concentrically to each other.

3. Self-ventilated brake disk, according to claim 1, wherein each of the two opposed faces of the circular crown are provided with grooves, each groove in each of the two opposed faces including the bridge portions.

* * * * *